(12) United States Patent
Sweet

(10) Patent No.: US 7,033,619 B2
(45) Date of Patent: *Apr. 25, 2006

(54) METHOD FOR MAKING HERBAL EXTRACTS USING PERCOLATION

(76) Inventor: Earle C. Sweet, 530 Oxford St. West, London (CA)

(*) Notice: Subject to any disclaimer, the term of this patent is extended or adjusted under 35 U.S.C. 154(b) by 206 days.

This patent is subject to a terminal disclaimer.

(21) Appl. No.: 10/355,034

(22) Filed: Jan. 31, 2003

(65) Prior Publication Data

US 2003/0124204 A1    Jul. 3, 2003

Related U.S. Application Data

(62) Division of application No. 09/520,881, filed on Apr. 5, 2000, now Pat. No. 6,555,074.

(51) Int. Cl.
*A61K 35/78* (2006.01)
*B01D 11/02* (2006.01)

(52) U.S. Cl. ...................... 424/725; 422/281
(58) Field of Classification Search ............. 424/725; 99/279; 422/281
See application file for complete search history.

(56) References Cited

U.S. PATENT DOCUMENTS

| | | | |
|---|---|---|---|
| 4,213,941 A | 7/1980 | Boomer | |
| 4,307,064 A | 12/1981 | Barger et al. | |
| 4,590,264 A * | 5/1986 | Hecht et al. | ............... 536/18.2 |
| 4,832,951 A | 5/1989 | Chang-Diaz | |
| 4,922,812 A | 5/1990 | Schweinfurth | |
| 4,952,603 A | 8/1990 | ElFeraly | |
| 5,738,001 A | 4/1998 | Liverani | |
| 5,858,371 A * | 1/1999 | Singh et al. | |
| 6,027,716 A | 2/2000 | Levin et al. | |
| 6,132,726 A | 10/2000 | Daughenbaugh et al. | |
| 6,193,805 B1 | 2/2001 | Cargill | |
| 6,656,437 B1 * | 12/2003 | Sweet | ............... 422/281 |

* cited by examiner

*Primary Examiner*—Susan Coe
*Assistant Examiner*—Randall Winston
(74) *Attorney, Agent, or Firm*—Clark & Brody

(57) ABSTRACT

The present invention comprises an apparatus and methods for making herbal extracts. The apparatus employs a percolation vessel having a filter and discharge valve. A heater is provided to heat the contents of the vessel to up to about 60° C. during the cold percolation process. A control is provided to monitor the contents of the vessel and regulate the heater output to obtain and maintain the proper temperature. A pump draws the output of the vessel and recirculates it to the vessel top so that the vessel effluent passes through the vessel charge. The method entails continuously percolating a solvent through a bed of herbaceous material in the vessel at a temperature between room temperature and about 60° C. to produce an extract comprising active principles contained in the herbaceous material. The thus produced extract is highly concentrated and contains a large proportion of the active principles in the raw material. The thus-produced extract can be used in lower unit doses to provide enhanced medicinal treatment.

11 Claims, 2 Drawing Sheets

METHOD FOR MAKING HERBAL EXTRACTS USING PERCOLATION

This application is a divisional application of Ser. No. 09/520,881 filed on Apr. 5, 2000 now U.S. Pat. No. 6,555,074.

FIELD OF THE INVENTION

The present invention is directed to a method and apparatus for making herbal extracts, and in particular, a method and apparatus that employs cold percolation to extract high levels of active principles from any herbal material for improved economic and medicinal effects.

BACKGROUND ART

In the prior art, herbal extracts and tinctures are commonly made using one or more solvents to extract one or more active principles contained in the herbaceous raw material being treated. Extraction techniques used to date include either percolation or maceration techniques.

U.S. Pat. No. 4,952,603 to Elferaly et al. teaches a method of isolation of artemisinin from Artemisia annua. In this method, dried unground leaves of Artemisia are extracted by continuous hot percolation over a period of 48 hours using n-hexane as a solvent. Hot percolation is akin to the percolation of coffee wherein the liquid is heated to boiling to achieve extraction of the material being treated.

Another known technique for the extraction of active principles from an herbaceous material is maceration In this process, the herbaceous material is combined with one or more solvents and allowed to steep for a period of time, usually 14–38 days. The batch is usually mixed or stirred twice daily. During this steeping period, the active principles are extracted into the solvent and the active principle-containing solvent is drawn off after the period of steeping is complete.

The prior art also uses a percolation system whereby the solvent is merely allowed to percolate or pass through the herbaceous raw material.

FIG. 1 shows an exemplary percolation apparatus designated by the reference numeral 10. In this process, a conical or cylindrical vessel 1 with a stopcock 3 at the base thereof is used. The vessel is supported by members 4. The vessels can be made of glass, copper or stainless steel. Typically, the depth of the material to be processed is about 5 times the diameter of the cylindrical percolator. For example, a percolator having a 4.5-inch diameter would require a column height of 22.5 inches for the material. Prior to the actual percolation, the material is comminuted to a particular size and soaked in the solvent or menstruum to be used for about 2 hours. This allows the material to swell prior to being charged to the percolator vessel. The comminution should be sufficient to allow the material to be in contact with the solvent but should not be too fine to cause clogging during the percolation process. The degree of comminution depends on the herbaceous material. For most herbs, a tealeaf cut is preferred, i.e., having particles the size of tealeaves.

Prior to charging the vessel, a sieve plate 5 and a wad of cotton or filter paper 7 are placed in the vessel 1, preferably in the neck thereof, to prevent the stopcock 3 from clogging. The sieve plate 5 also supports the charge of material 9.

The pre-swollen drug as the charge, also known as the marc, is then placed in the vessel 1 on top of the sieve plate 5, and distributed so that channels are not formed that would allow uneven flow of the solvent through the marc 9.

The marc 9 is then covered with filter paper 11, weighted down with glass beads 13, and covered with a lid 15. The solvent is then poured onto the filter paper/glass bead layer and allowed to saturate the marc 9. The stopcock is open during this step to force air out of bottom of the vessel and through the stopcock.

As soon as the liquid 21 begins to drip out into the beaker 23, the stopcock 3 is closed and the marc is allowed to macerate for a period of about 24 hours. The extract is then allowed to drip out at a percolation rate of about 4–6 drops per minute for each 100 grams of crude material. For 1000 grams of material, the rate would be 40–60 drops per minute.

The first run of the solvent has the highest percentage of active principles and is commonly referred to as first runnings or extraction head. The first runnings generally extract about 45% of the active principles. A second run or pass would produce an extract with about 23% with a third run or pass having about 12%. A fourth pass would have about 3% and a fifth pass has about 1%. In this one through process, there is an ever-diminishing return with about 84% of the active principles recovered.

The prior art techniques mentioned above have drawbacks that hinder the efficient and effective extraction of active principles from herbaceous raw materials. In the percolation technique, production is very slow and only about 45% of the active principles are recovered at best in the first runnings. In addition, solvent evaporation is high, thus contributing to increased costs.

Maceration techniques take too long, and only recover 35–38% of the active principles from the herb. The prior art percolation technique fails in its ability to extract many of the active principles in the herb and is also slow in its once through processing.

As such, a need has developed to provide improved ways to extract active principles from herbs/plants that overcome the disadvantages known in the prior art. The present invention solves the prior art problems by providing a method and apparatus that extracts active principles from herbaceous raw materials more economically and in concentrations providing enhanced medicinal effects to users.

SUMMARY OF THE INVENTION

Accordingly, it is a first object of the present invention to provide an improved apparatus for making herbal extracts.

Another object of the present invention is a method of manufacturing herbal extracts.

A still further object of the present invention is a method and apparatus for making herbal extracts that are economically attractive.

Yet another object of the invention is a method and apparatus that produces herbal extracts with increased levels of active principles over prior art techniques.

One other object of the present invention is a method of using high concentration extracts in lower unit doses for patient use.

A still further object of the invention is a method and apparatus that extracts a large majority of the active principles of an herbaceous material, whether identified or not for medicinal purposes.

Other objects and advantages will become apparent as a description thereof proceeds.

In satisfaction of the foregoing objects and advantages, the present invention is an advancement of the prior art techniques of hot percolation, percolation, and maceration for producing herbal extracts. The inventive apparatus is an improvement in percolation apparatus that use a percolation vessel with an inlet end and a discharge end, a valve positioned upstream from the discharge end, and a filter in the vessel to support a bed of herbal material. The inventive apparatus uses a pump, an inlet of the pump connected to the discharge end of the vessel and a pump outlet connected to the inlet end of the vessel. A heater is positioned adjacent to the vessel and a temperature sensing and control device is provided for controlling output of the heater and for maintaining the bed of herbal material and liquid passing therethrough at an elevated temperature between room temperature and but no higher than to 60° C.

Preferably, the heater is heating tape or a heating belt that is wrapped around the exterior of the vessel. The temperature control device can include a thermocouple or probe, the probe preferably inserted into the vessel adjacent a wall thereof.

The pump is preferably a peristaltic type. A number of vessels can be used in the same or similar sizes to enhance production. If desired, a single pump can be employed to recirculate the extract for each of the plurality of vessels.

The components of the system are preferably inert materials such as glass, food grade polymers (norprene or tygon tubing) and the like to ensure a high quality output from the vessels once the process is terminated. Additional filters can be provided to clarify the extract once produced.

The inventive method is an improvement over prior art percolation methods that heat solvents to boiling for extraction purposes or merely rely on once-through percolation or maceration techniques. The improvement comprises recirculating the liquid extract through the bed of herbal material for a period of time while maintaining the bed of herbal material and recirculating liquid extract (menstruum) at an elevated temperature between room temperature and up to 60° C., and recovering a final liquid extract containing an increased level of active principles. The herb material is preferably dried and ground to a mesh size of between 10 and 80 mesh, more preferably 20–40 mesh (US) prior to adding to the vessel.

The vessel may be heated from its exterior using heating tape adhered to the vessel surface and a probe may be inserted in the bed of herbal material for temperature control. Shrinkage due to absorption of solvent by the herbal material may be determined as part of the method by stopping the recirculation and measuring the loss of solvent due to absorption. The solvent is replaced and the recirculation is continued to make the desired extract.

The solvent is preferably an alcohol and water mix but may be other solvents. A protocol using a known starting weight of the herbal material, a known volume of finished product to be obtained and a percentage of alcohol in the finished extract based on the herb to be processed can be used to initiate and guide the method.

Extracts, tinctures or the like produced by the inventive apparatus and method can be used as is or combined with other extracts for medicinal purposes. In addition, one or more extracts can be utilized to make tonics for medicinal use.

BRIEF DESCRIPTION OF THE DRAWINGS

Reference is now made to the drawings of the invention wherein.

DESCRIPTION OF THE PREFERRED EMBODIMENTS

Figure 2:
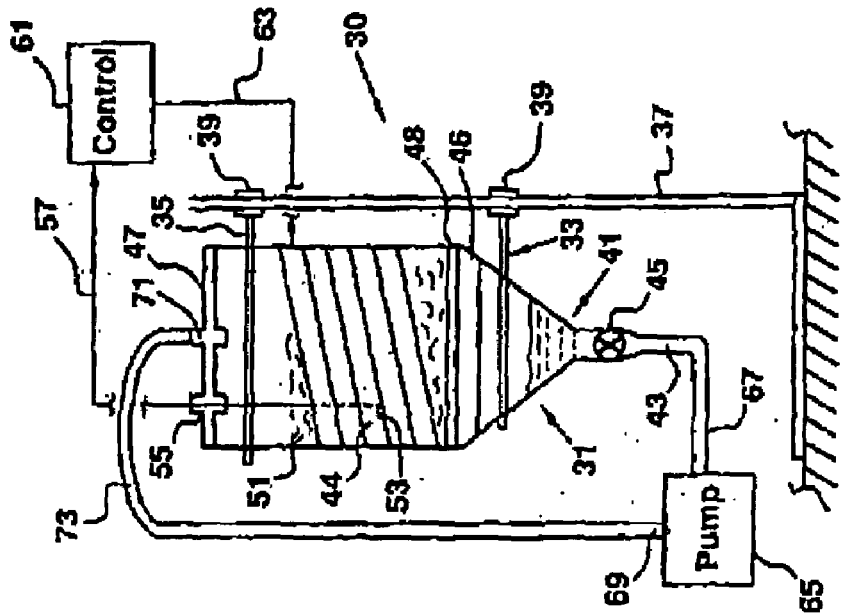
FIG. 2 is a schematic view of one embodiment of the inventive apparatus.

The present invention is a significant advancement in the field of making herbal extracts for medicinal purposes. The invention offers vast economic benefits since larger quantities of extracts can be produced in much less time than required using prior art techniques.

The invention also produces extracts that have significantly more active principles that prior art techniques. Extracts obtained using the inventive techniques also have active principles that may not readily be obtained using other methods and apparatus. Increasing the types of active principles obtained from a given herbaceous material can result in improved medicinal benefits over extracts that may be limited to only a few active principles.

By the simplicity of the invention, a manufacturer can control the quality, the supplies and the cost of manufacturing. The best herbs can be purchased to make the best medicines since large quantities are not necessarily required as in some prior art operations. A broad range of starting materials is possible due to the inventive process and apparatus so that a wide variety of medicines can be made. Large commercial manufacturing facilities do not have such flexibility or breadth in the types of medicines available. Costs are significantly reduced since the time to produce an extract is drastically reduced.

The inventive apparatus and method also provides a significant increase in the recovery of the active principles for an herbal material. It has been consistently shown that 40% more active principles are extracted with the invention as compared to the prior art. In some instances two to three times the amount of extract obtained conventionally is obtained when practicing the invention. This increase is significant because less material is needed to treat a patient and the medicinal effectiveness is increased by reason that more active principles are in the extract.

Another advantage to the invention is that the high concentration of the active principles in the extract allows for lower unit doses and introduces more active principles, whether known or unknown, to the patient. Thus, remedial effects from a combination of a number of active principles can be realized over prior art herbal extracts that may only use a few active principles. In addition, since the unit doses are small, there is less chance of a user reacting or exhibiting sensitivity to one or more of the active principles or inerts in the extract.

A basic tenet to the making of the herbal extracts is the use of a solvent to draw the active principles out of the raw herbaceous material. Usual solvents include alcohol, water, glycerin, vinegar, and ether. Alcohol is one of the most active solvents. Water when used alone makes an infusion or decoction, similar to tea brewing. Glycerin extracts most alcohol solvent items, and ether is generally too volatile for common use. Of course, other solvents as are known in the art can be employed in accordance with the invention.

As noted above, the solvent extracts the active principles found in the herbaceous raw material. Active principles are those components of a plant or. herb, which are medicinal in nature. Examples of active principles include alkaloids, amaroids, balsams, bitters, camphors, fecula, flavinoids, fixed oils, glycosides, gums, mineral compounds, mucilage and pectin, organic acids, resins, saponins, volatile oils, tannins, waxes, and the like. The active principles can be dissolved with different solvents, and obtained in different concentrations. For example, the alkaloids, amaroids, and bitters can be dissolved using a 45–60% alcohol solvent (defined as 45% pure alcohol in distilled water). The glycosides, the saponins, and the tannins can be extracted using a 25–60% alcohol solvent. The fecula, mineral compounds, mucilage and pectin, organic acids are water-soluble. The balsams, camphors, fixed oils, and volatile oils may require 60–90% alcohol.

In this group, the alkaloids, bitters, glycosides, resins, saponins, tannins, and volatile oils are the more preferred medicinal agents.

The raw materials for the process can be fresh, fresh dried, or dried. The part of the plant used as the raw material can vary as well. Certain plants have most of the active principles in the roots while others have the active principles in the leaves, and some have active principles in both. The following gives a list of the part of the plant having the active principles and the corresponding type of plant.

| Material | Plant examples |
| --- | --- |
| Bark | cascara sagrada, cinnamon |
| Bulbs | white squill, garlic |
| Corms | colchicum, trillium |
| Exudates/resins | copaiba, dragon's blood |
| Fecula | tapioca |
| Flowers | chrysanthemum, arnica |
| Fruit | jujube dates, hops |
| Herb | peppermint, irish moss |
| Juices | milkweed, dusty miller |
| Leaves | jaborandi, ginkgo biloba |
| Rhizomes | valerian, mandrake |
| Root bark | wahoo, baptista |
| Roots | burdock, echinacea |
| Seeds | caraway, fenugreek |
| Spores | club moss |
| Tubers | jalap, corydalis |
| Wood chips | quassia, dulcamara |

It should be understood that the list above is not all-inclusive and that other plants and plant parts may be used.

In terms of the state of the material to be processed, some plants should be processed right away so that the active principles are not lost, e.g., walnut hulls. Others can be dried and used months thereafter. Fresh dried herbs and plants are most preferred. It is desirable to remove at least 80% of the moisture without driving off the active principles. Drying to this degree makes a thirsty sample, which has a greater affinity for uptake of the solvent, also known as the menstruum. Fresh dried materials are preferred because they usually have reduced enzymatic activity and bacterial and fungal action on the plant due to the lower moisture content. An ideal moisture content for the starting material is believed to range between about 5–15%, more preferably 8–12%.

When using dried raw material, the material should be ground or comminuted into an appropriate size range for the percolation process. While the degrees of grinding can vary, it is preferred that the material be ground to a rough cut state typically called cut and sifted. This equates to a size between about 10 mesh US (sieve opening of 2.0 mm) and 80 mesh US (sieve opening of 0.177 mm), preferably 20 mesh US (sieve opening of 0.841 mm) and 40 mesh US (sieve opening of 0.420 mm).

The extracts made using the inventive apparatus and method will vary in concentration and type. First, it should be understood that the term extract is primarily used to identify the product produced by the inventive percolation method and apparatus. As explained below, the generic extract is given other descriptions depending on its protocol and relationship between the weights of the finished product and the starting raw herbaceous material.

For example, a fluid extract indicates a strong medicine made using a 1:1 protocol. A 1:1 protocol means that one portion of the dry raw material makes an equal volume (by weight) of finished product or remedy. A tincture generally follows a protocol ranging from 1:3 to 1:20. The following list exemplifies different types of herbal medicines and their protocols:

| Fresh Extract | 5:1 Ratio |
| --- | --- |
| Solid Extract | 4:1 Ratio |
| Fluid Extract | 1:1 Ratio |
| Saturated Tinctures | 1:2 Ratio |
| Herbal Tinctures | 1:3, 1:5, 1:8, 1:10, and 1:20 Ratios |
| Homeopathic Mother Tinctures | 1:10 Ratio |

In conjunction with the protocols and solvents mentioned above, a preferred list of solvents for extracting is 25% alcohol, 45% alcohol, 60% alcohol, and 90% alcohol. The 25% value is useful where the active principles are mostly water-soluble. 45% alcohol is useful to collect tannins, some glycosides and some alkaloids. 60% alcohol is useful to collect some alkaloids, some glycosides, tannins and saponins. The 90% alcohol is useful to collect resins and oils.

To produce an extract, typically a protocol is established as a ratio of the dried starting material, the weight in volume of the final product and the alcohol percentage in the final product. For example, polygonum bistorta or bistort root can have a protocol of 1:5×45%. This means that one dry weight of the herbal material makes five liquid volumes (by weight) of medicine of which is 45% alcohol. The alcohol can come from 95% grain alcohol. When alcohol is the named percentage in the protocol, the remainder is distilled water to make up the whole. Distilled water is preferred since its minerals have been removed and it is "thirsty water", making it a better vehicle for extraction purposes. When using water and alcohol, five times the weight of the starting material directly translates to volume since the specific gravity is essentially 1 (one), 100 grams makes 500 mls.

Once given the protocol, the inventive apparatus can be employed to practice the inventive process. The apparatus is a modified percolation apparatus that employs a heater in association with or positioned around the percolation vessel so that the herbal powder being processed, commonly referred to as the marc, is subjected to temperatures between room temperature and 60° C., preferably between 35 and 55° C., with a target of about 50° C. Of course, any temperature slightly elevated above room temperature can be used up to the 60° C. limit, just that the higher the temperature is, the more active principles are recovered. It is estimated that for every 10° C. increase, a 10% gain in active principle extraction is attained. Maintaining a target temperature also maintains the recirculating liquid at the elevated temperature as well.

Figure 1:
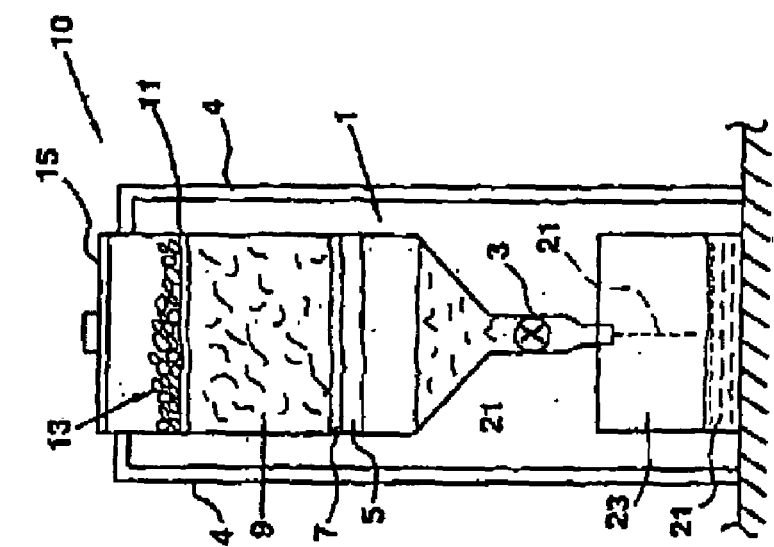
FIG. 1 is a schematic of a prior art percolation apparatus.

FIG. 2 shows an exemplary apparatus that is generally designated by the reference numeral 30 and includes a vessel 31 that is similar to the vessel 1 of FIG. 1. The vessel 31 rests on supports 33 and 35, both adjustably secured to the stand 37 by clamps 39. It should be understood that any type of supports could be used to support the vessel 31. It is preferred that the vessel is glass because this material is completely inert and has no adverse effect on the quality of extract, but stainless steel could also be used.

The vessel 31 is shown with a necked portion 41, which terminates at an end 43. Disposed within the neck is a stopcock 45. Positioned within the vessel and upstream of the stopcock 45 is a filter 46, e.g., a stainless steel coffee filter and filter media 48, e.g., filter paper. Although not shown, the filter could be disposed in neck of the vessel so that the filter is supported and retained by the converging neck walls, the tendency of the filter to move is reduced or eliminated. In addition, when using filter paper, the paper could be folded over the top edge of the filter for better sealing.

The vessel 31 has an open end with a lid 47. The lid 47 has two openings to facilitate the recirculation of the extract and control as explained below. Of course, other lid configurations could be employed. It should be understood that the vessel 31 can have any number of shapes and sizes depending on the amount of material to be processed at one time. The vessels could vary in size, e.g., be one of a 2.5, 5, 8, 12, and 25-liter vessel or sizes larger or smaller depending on the requirements of a custom application. Larger amounts of raw material will require a larger vessel and attendant components. Likewise the filter 46 and filter media 48 can vary as would be within the skill of the art. Multiple set-ups can be used whereby one pump could service two or more vessels. The vessels may be mounted on a pivotal or swiveling support to ease maintenance, e.g., cleaning and filter replacement, particularly for large vessels such as the 25-liter size. The vessel could also employ a filter ring support within the vessel interior to help the filter retain its shape and avoid distortion.

The apparatus also has a heater shown in the form of heater tape 49 encircling at least a portion of the vessel 31. The heater tape is powered by electricity and functions to heat the marc 51 to the desired temperature via conduction. The temperature is controlled by a control circuit comprising a thermocouple 53 inserted into the vessel 31 through the opening 55 in the lid 47. The thermocouple 53 is linked to a controller 61 via lead 57 so that the controller 61 can sense what the temperature is in the marc 51. The controller is set to control the temperature to a target or target range for the process. For example, a target of 50° C. could be used. The control would then regulate the power to the heater tape 49 via lead 63 to assure that the temperature would be maintained at the target level within a certain tolerance. The controller, heater tape and thermocouple are well known components for temperature control and a further description thereof is not believed to be necessary for understanding of the invention. Preferably the control range is +/−1 to 2 degrees.

The apparatus 30 also has a recirculating pump 65, which is interposed between the end 43 of the necked portion 41, and the top of the vessel 31. The pump 65 is preferably a variable speed/reversible peristaltic pump so that the pump mechanism does not contact the pristine extract flowing out of the end 43 of the vessel 31. The pump connects to the end 43 via tubing 67 or the like. Similarly, the pump outlet 69 interconnects with the opening 71 in the lid 47 via tubing 73. The stopcock 45 can be made out of an inert material, e.g., food grade polymer, so that no contamination occurs with respect to the extract being produced. An important aspect of the apparatus is assuring that the extract does not come into contact with materials that may adversely affect the active principles therein. A problem with prior art apparatus was the use of copper and/or brass vessels, rubber tubing and the like.

Figure 3:
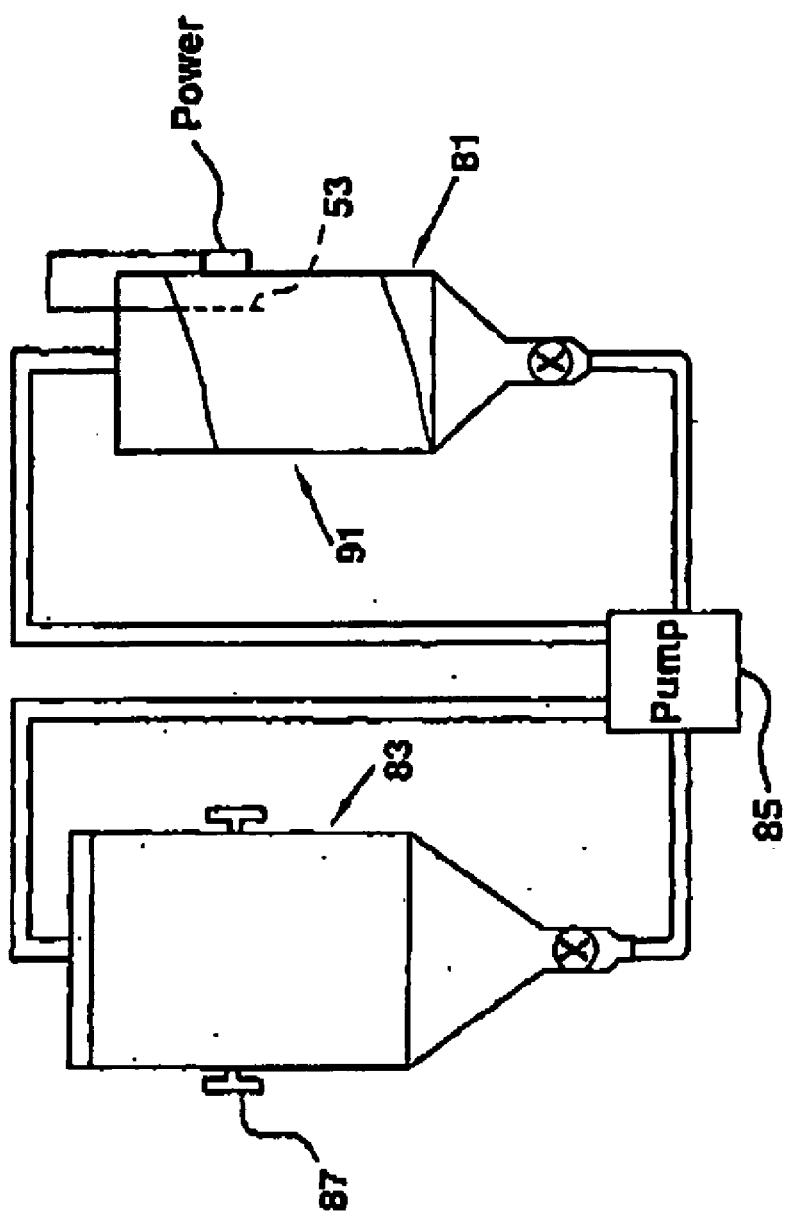
FIG. 3 is a schematic view of another embodiment of the inventive apparatus.

A modular approach can also be utilized as another embodiment of the invention. Referring to FIG. 3, a pair of vessels 81 and 83 are depicted using a single pump 85 for operation. The use of a peristaltic pump makes an ideal modular set-up since a number of vessels can be used with a single pump. The vessel 83 is shown with swivelable or pivotal supports 87 so that the vessel can be tilted for easy cleaning and filter replacement/maintenance. The vessel 81 is shown with an alternative control device 91. The device is a heating belt that surrounds the vessel 81, attaches in any conventional manner, and has its own thermostat control 93. The probe 53 sends a signal to the belt thermostat 93 for temperature regulation, rather than using heating tape and a separate controller as shown in FIG. 2. Although not shown, the vessel 83 could employ the same control (but larger) device.

In practicing the inventive method, the herb or plant to be treated is first selected and the appropriate protocol is selected. As an example, the herb chamomile is selected with a protocol of 1:5×60%.

The flower heads of the herb are crushed to a powder sized between 20 and 40 mesh. The crushing or grinding can be done with a coffee grinder, a vita-mix blender or an equivalent. By preference the grinding is not done with stone grinders or equipment which generates a great deal of heat in the grinding process. Heat in this application would alter adversely the active principles of the plant material. A 200 gram amount of the powder is weighed, although other amounts could be used.

The powder is poured slowly into the vessel 31. Once the powder is poured into the filter, it should be tamped to remove any air bubbles or channels. Care should be taken not to use excessive tamping force so that the filter 46 is not dislocated and powder enters the necked portion 41.

A second very effective option is to blend the powder with about ½ of the solvent until totally wet powder can be poured into the percolator. This will speed up the process by having all of the powder particles wet before adding to the mixture once in the percolator, the remainder of the solvent. Following this option is particularly beneficial if the powder is very fine, or if the nature of the marc is very absorbent. Of course, in this preparation there is no need to tamp the mixture since it was poured into the vessel.

To prepare the solvent, the protocol of 1:5 would dictate that the finished product should be 5×200 grams or 1000 ml of finished tincture. Since the specific gravity of water is one, 5 times the starting weight is 1000 grams or 1000 ml.

The 60% solvent mixture is made by adding 630 ml of 95% alcohol (equivalent to 600 ml of 100% alcohol) and 370 ml water. If a different source of alcohol were used, e.g., vodka, the amount of vodka (50% alcohol) would be increased with a corresponding decrease in the water amount. Water and alcohol always blend since they are miscible. The solvents should be blended first and then poured over the herb powder rather than pouring one and then the other.

The 1000 ml is poured slowly into the percolator to wet the upper surface of the powder. The solvent will eventually trickle down through the powder and a yellow liquid, the menstruum, will begin to drip out of the filter 46 and into the necked portion 41.

At this point, the stopcock can be opened to allow the pump to suck air out of the vessel and creating a vacuum on the menstruum by creating a pressure drop, preferably about 20 psi negative pressure at the stopcock connection. Once the flow begins into the neck, the pump speed can be adjusted to cause a free flow of liquid into the tubing 67. Of course, other pump pressures can be used depending on the herb powder being processed and desired flow rates.

The throughput/rate can be determined by first stopping the pump, and directing the tubing 73 into a graduated cylinder. The pump is started and the time it takes to collect 500 ml or some other volume is measured. If a five-minute period is measured to pump 500 ml, and a batch of 2000 ml is the target, this means that the 2000 ml batch volume is being pumped through the vessel every 20 minutes. If you want to pass the 2000 ml through the vessel ten times, then 200 minutes of pumping is required. If the rate is less than 500 ml per 5 minutes, the time will be longer for a 10-time throughput. The ideal number of times the menstruum is passed through the marc remains variable to each batch of herbal material, however, as a good rule of thumb, usually not less than 10 times and seldom over 100 times, dependent on the interpretation of the process manager as to when the marc is exhausted (spent).

A preferred technique is to pump for an hour and let the menstruum sit in the vessel for an hour, and repeat this cycle for 3 to 6 hours of pumping, or 6–12 hours total, preferably closer to 6–8 hours total, and ideally 7 hours total. That represents 3 cycles of pumping and 3 cycles of rest with the $7^{th}$ cycle near the end of the hour having menstruum pumped off for further filtration or storage. Using a three to four hour pump cycle substantially increases the potency of the extract over prior art techniques, e.g., by 40% consistently, and in some instances to ~20 times the potency. The increase in potency is determined based on an active principle which is typically tested for that plant material. When that tested principle is vastly greater than is found in the prior art, this accounts for some measurements that vastly exceed prior art yields.

A shrinkage determination must be made to tell the operator how much more solvent must be added to account for absorption by the dry herbal material. Since the raw material is thirsty because of the drying step, the material will absorb some of the solvent. Determining shrinkage allows for this absorption so that the final ideal batch volume is attained.

The shrinkage determination is preferably made at the end of the first hour of pumping so that a certain degree of saturation of the herbal powder has occurred.

To determine shrinkage, the pump should be shut off and the menstruum in the vessel should be drained therefrom and measured. This measurement tells you how much of the initial solvent was absorbed by the thirsty herbal powder. For example, if you start with 1000 ml of solvent and measure 700 ml after one hour of pumping, shrinkage accounted for 300 ml of solvent absorbed by the herb. This solvent should then be replaced to maintain the original protocol of 1000 ml of product. To do this, additional solvent in the proper alcohol percentage is mixed with the menstruum. The solvent-supplemented menstruum is added to the vessel and the percolation process is begun until the marc is exhausted. As an example, if the protocol is 1:5×45% and 400 grams of herbal powder are used, the final volume would be 2000 ml at 45% alcohol or 950 mls alcohol (actually 947.3648 mls rounded off to an even number). In making a liter of solvent, 475 mls of alcohol are combined with 525 ml of water (2.0 times this amount for the entire batch). Shrinkage may account for 300 mls. Thus, 2300 mls of original protocol solvent is the total ultimately needed after the shrinkage step is performed.

Performing the shrinkage determination step as part of the percolation process is advantageous because the herb actually tells you what the shrinkage is, not a predetermined estimate based on a commercial manufacturer's experience. Since every raw material sample may be different, determining shrinkage as part of the percolation process itself adheres more closely to the target protocol.

Once the marc is exhausted, the extract can be bottled and labeled, or combined with one or more other extracts to make a combination fluid extract, a combination tincture, an herbal tonic, or the like. The extract is now suitable for medicinal purposes. If made into a tincture, a set number of drops of tincture can be added to water or some other carrier (juice) as an administered dose.

Some herbal extracts will come off the percolators with the menstruum cloudy or less than translucent. If this should happen once the extract is made, it can be filtered using a frit glass filter system for clarification purposes. Passing this extract through preferably a 4-micron frit glass filter is ideal for clarification purposes. Other filter media could be used as well providing that the filter media removes the cloudy appearance of the extract. The presence of a cloudy extract also serves as an indicator that the marc is exhausted or near exhaustion.

The heater, although described as a tape element, may also take other forms. A heated water jacket could be employed that would wrap around the vessel exterior and contain a recirculating elevated temperature fluid. A heater belt could be utilized as well. The belt would wrap around the vessel in a similar fashion as the repeated windings of the heater tape as shown in FIG. 3.

The temperature control system could also vary. In the disclosed embodiment, the probe (stainless steel thermocouple) produces a temperature signal that is received by the control unit and the control unit then regulates the power to the heater device to increase or shut off the heater. Alternatively as shown in FIG. 3, the heater tape or its equivalent, e.g., a heater belt, could employ a thermostat and the thermostat itself would sense temperatures and control the temperature adjustment. Of course, other heating and control systems could be employed as would be within the skill of the art. that would maintain the marc and recirculating liquid within the desired temperature range.

When using a temperature probe, it is preferable to place the probe near the vessel wall rather than in the center of the vessel. In this way, overheating of the marc proximal to the glass wall/stainless surface is avoided, should the heater continue to heat until the center is at temperature is avoided. Placing the probe near the vessel wall allows the heat to radiate and conduct to the center of the vessel and minimizes the potential of overheating the marc.

While a peristaltic pump is disclosed as a preferred pump, other pump systems could be utilized that would keep the pump mechanism from contacting the extract derived from the vessel, e.g., a diaphragm pump or the like.

The method and apparatus can be utilized to extract active principles from any herb or combination of herbs as would be desired by the herbalist or other user of the apparatus.

In addition, once the extract is obtained, it could be combined with another extract or extracts or modified to be in tonic form. Tonics are forms of herbal medicines whereby an extract or an extract combination are combined with a base such a fruit syrup to improve flavor and ensure compliance with the daily dose requirements to be administered. Tonics can also employ special syrups to keep the active principles in suspension in the liquid. Some active principles such as tannins and alkaloids may form larger molecules and tend to settle out of a fluid extract or tincture. The tonic helps suspend the active principle so that each dose gives a patient the same amount of active principles.

The apparatus employed to obtain the extracts is by nature modular in design and can be adapted to accommodate different user's requirements in terms of the amount of extracts or types of products needed for the day's production run. That is, a pump could be used to operate a number of vessels at one time, either the same of different sizes. Thus, an operator could start out with a single vessel and build up to as many as 10 vessels, each with the same or different capacities. Thus, a manufacturing operation would have great flexibility in producing small and large amounts of any extract required.

One advantage in the instant invention can be ascertained when considering the production of a tincture from the jaborandi leaf. Jaborandi is primarily used for its active principle pilocarpine. Pilocarpine when extracted and isolated is used to treat glaucoma via eye drops. The treatment does not eliminate glaucoma but does appear to lessen its symptoms. However, when using jaborandi leaves, according to the invention, some 199 active principles in addition to pilocarpine exist in the extract. Studies whereby patients have taken the extract as a liquid have shown that the entire remedy from the jaborandi leaves, i.e., all of the 199 active principles plus the pilocarpine, eliminates glaucoma by correcting the faulty valve so that the proper fluid pressure is maintained in the eye.

The inventive method allows for the use of smaller doses of herbal medicine at increased concentration than prior art formulations and reduces manufacturing costs. By using the inventive apparatus and method, significant increases in the concentration of the active principles in the extract is can be achieved. Since the extract has a higher concentration of active principles, doses can be administered in small amounts. For example, where 3–5 ml of a prior art extract may be used once or twice daily, 20 ml of cold percolate extract made according to the invention will be all that is required for a one month duration of treatment.

Economics are improved as well. For example, a batch of 1250 ml product may cost $150.00, with a third being raw material cost, a third profit and a third overhead, about $0.12/ml. If the batch size was tripled to about 3815 ml, the unit cost would drop to about $0.04/ml. Bottles can be sold as 30, 50, or 100 ml (1.0, 1.5, and 3.0 ounces, respectively). A 100 ml bottle selling for $21.00 dollars would cost about $5.00 to make at $0.04/ml and have a profit margin of about $14.00 dollars.

Because of the high level of active principles in the extract, a small bottle, e.g., 100 ml, would still provide a sizeable medicinal effect since the unit dose level would be relatively small, e.g., 20 ml over a span of a month. Alternatively, the highly concentrated extract can be employed in combination with other extracts to make a medicinal compound or herbal tonic.

The apparatus can also be used as a blender for making herbal products. In this mode, extracts could be added to the blender with a base, e.g., an alcohol or syrup base, and recirculated through the system for a period of time. The resultant product is a homogenous blend of the base and the extracts. As an example, a liqueur of several ingredients can be blended or an aromatic massage oil can be blended and experiments to combine the essential oil ingredients for an after shave lotion proved the equipment's worth as a blender/homogenizer. When blending, the basic item, i.e., the largest single ingredient, would be added to the vessel and then a prescribed amount of one or more extracts could be added, this once the menstruum has arrived at the ideal temperature. The stopcock would be opened and the pump started to recirculate the extract-containing base for a set period of time. There is no need for heating when blending, but heating the mixture up to a temperature of 50° C. adds to the homogeneity of the end result. When processing items of a dense syrupy nature, adding weight to the coffee filter in the form of glass marbles prevents the filters from floating and rising to the top of the syrup. Other extracts and or other flavor systems can also be added during the blending as well.

As such, an invention has been disclosed in terms of preferred embodiments thereof which fulfills each and every one of the objects of the present invention as set forth above and provides a new and improved method and apparatus for making herbal extracts.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method of extracting active principles from a herbal material comprising:
    a) providing a vessel;
    b) filling the vessel with a herbal material to form a bed of herbal material;
    c) passing a solvent through the bed of material to generate a liquid extract exiting the vessel;
    d) recirculating the liquid extract exiting the vessel through the bed of herbal material for a period of time and maintaining the bed of herbal material and liquid extract recirculating through the bed at a temperature above room temperature and up to 60° C.; and
    e) recovering a final liquid extract when the period of time expires and the recirculating step is terminated, the final liquid extract containing an increased level of active principles.

2. The method of claim 1, wherein the maintaining step further comprises applying heat to an exterior of the vessel.

3. The method of claim 1, wherein a temperature of the bed of material is monitored for the maintaining step.

4. The method of claim 2, wherein the heat is applied using heating tape surrounding at least a portion of the exterior of the vessel.

5. The method of claim 1, wherein the herbal material is ground prior to being added to the vessel.

6. The method of claim 5, wherein the herbal material is ground to a mesh size between about 10 and 80 mesh.

7. The method of claim 1, wherein the solvent is one of distilled water, alcohol, vinegar, glycerin or a mixture thereof.

8. The method of claim 7, wherein the solvent is a mixture of alcohol and distilled water.

9. The method of claim 1, wherein a starting weight of the herbal bed of material, a final volume of the liquid extract, and a percentage of the solvent in the final liquid extract is selected based on the herb being processed.

10. A method of extracting active principles from a herbal material comprising:
    a) providing a vessel;
    b) filling the vessel with a herbal material to form a bed of herbal material;
    c) passing a solvent through the bed of material to generate a liquid extract exiting the vessel;
    d) recirculating the liquid extract exiting the vessel through the bed of herbal material for a period of time and maintaining the bed of herbal material and liquid extract recirculating through the bed at a temperature above room temperature and up to 60° C.;

e) disrupting the recirculating of the liquid extract, draining the liquid extract in the vessel, measuring an amount of the drained liquid extract and comparing the measured amount with a target amount of the final liquid extract, adding an amount of solvent corresponding to a difference between the measured amount and the target amount to the drained liquid extract to form a supplemented liquid extract, and continuing to recirculate the supplemented liquid extract for the period of time; and f) recovering a final liquid extract when the period of time expires and the recirculating step is terminated, the final liquid extract containing an increased level of active principles.

11. The method of claim 1, wherein the liquid extract exiting the vessel is pumped to the bed of herbal material.

\* \* \* \* \*